United States Patent
Kang et al.

(10) Patent No.: US 8,365,605 B2
(45) Date of Patent: Feb. 5, 2013

(54) JOINTLESS PRESSURE SENSOR PORT

(75) Inventors: Yanling Kang, Northbrook, IL (US); Daniel J. Bratek, Arlington Heights, IL (US); Robert Kosberg, Wildwood, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 881 days.

(21) Appl. No.: 12/369,747

(22) Filed: Feb. 12, 2009

(65) Prior Publication Data

US 2010/0199776 A1    Aug. 12, 2010

(51) Int. Cl.
*G01L 13/02*    (2006.01)
*G01L 15/00*    (2006.01)

(52) U.S. Cl. ................. 73/716; 73/700; 73/753
(58) Field of Classification Search .................. None
See application file for complete search history.

(56) References Cited

U.S. PATENT DOCUMENTS

| | | | |
|---|---|---|---|
| 4,102,210 A * | 7/1978 | Couston et al. | 73/727 |
| 4,753,109 A * | 6/1988 | Zabler | 73/114.18 |
| 4,864,271 A * | 9/1989 | Yajima | 338/4 |
| 4,884,451 A * | 12/1989 | Schulze | 73/706 |
| 4,939,497 A | 7/1990 | Nishida et al. | |
| 5,179,861 A * | 1/1993 | Asano et al. | 73/726 |
| 5,488,868 A * | 2/1996 | Ootake et al. | 73/708 |
| 5,712,424 A * | 1/1998 | Reed | 73/114.16 |
| 5,714,680 A * | 2/1998 | Taylor et al. | 73/37 |
| 6,619,129 B2 | 9/2003 | Pitzer | |
| 6,823,718 B2 | 11/2004 | Sandford et al. | |
| 7,475,597 B2 * | 1/2009 | Brida et al. | 73/715 |
| 7,530,275 B2 * | 5/2009 | Wiedemann et al. | 73/715 |
| 2005/0097721 A1 * | 5/2005 | Bratek et al. | 29/505 |
| 2005/0139008 A1 | 6/2005 | Kaiser et al. | |
| 2006/0053894 A1 | 3/2006 | Kunda et al. | |
| 2007/0220989 A1 | 9/2007 | Uchigashima et al. | |

FOREIGN PATENT DOCUMENTS

| | | |
|---|---|---|
| DE | 3817695 | 12/1988 |
| DE | 3907202 | 9/1990 |

OTHER PUBLICATIONS

International Search Report and Written Opinion for PCT/US2010/024020, filed Feb. 12, 2010.
Khazan, Alexander D., Transducers and Their Elements: Design and Application, 1994, pp. 352-355, PTR Prentice Hall, Inc., Englewood Cliffs, New Jersey.

* cited by examiner

*Primary Examiner* — Lisa Caputo
*Assistant Examiner* — Jermaine Jenkins

(57) ABSTRACT

Methods and systems for measuring pressure through a jointless pressure sensor port are disclosed, including permitting a substance to pass into a jointless pressure sensor port comprising an aperture, a channel, and a diaphragm having a larger area than the area of the aperture, allowing the substance to come into contact with the diaphragm resulting in a mechanical stress on the diaphragm, and measuring the mechanical stress to generate a signal indicative of the substance pressure.

23 Claims, 7 Drawing Sheets

JOINTLESS PRESSURE SENSOR PORT

I. BACKGROUND

The invention relates generally to the field of pressure sensor ports.

II. SUMMARY

In one respect, disclosed is a method for measuring pressure through a jointless pressure sensor port, the method comprising: permitting a substance to pass into a jointless pressure sensor port comprising an aperture, a channel, and a diaphragm having a larger are than the area of the aperture, allowing the substance to come into contact with the diaphragm resulting in a mechanical stress on the diaphragm, and measuring the mechanical stress to generate an electrical signal indicative of the substance pressure.

In another respect, disclosed is a pressure sensor port comprising: a housing, where the housing is jointless; the housing comprising an aperture, a channel, and a diaphragm; where the diaphragm area is larger than the aperture area; where the aperture is configured to direct a substance through the channel toward the diaphragm; and where the substance is configured to exert a mechanical stress on the diaphragm.

In yet another respect, disclosed is a vehicle comprising: a pressure sensor port; the pressure sensor port comprising a housing, where the housing is jointless; the housing comprising an aperture, a channel, and a diaphragm; where the diaphragm area is larger than the aperture area; where the aperture is configured to direct a substance through the channel toward the diaphragm; and where the substance is configured to exert a mechanical stress on the diaphragm.

Numerous additional embodiments are also possible.

III. BRIEF DESCRIPTION OF THE DRAWINGS

Other objects and advantages of the invention may become apparent upon reading the detailed description and upon reference to the accompanying drawings.

Figure 1:
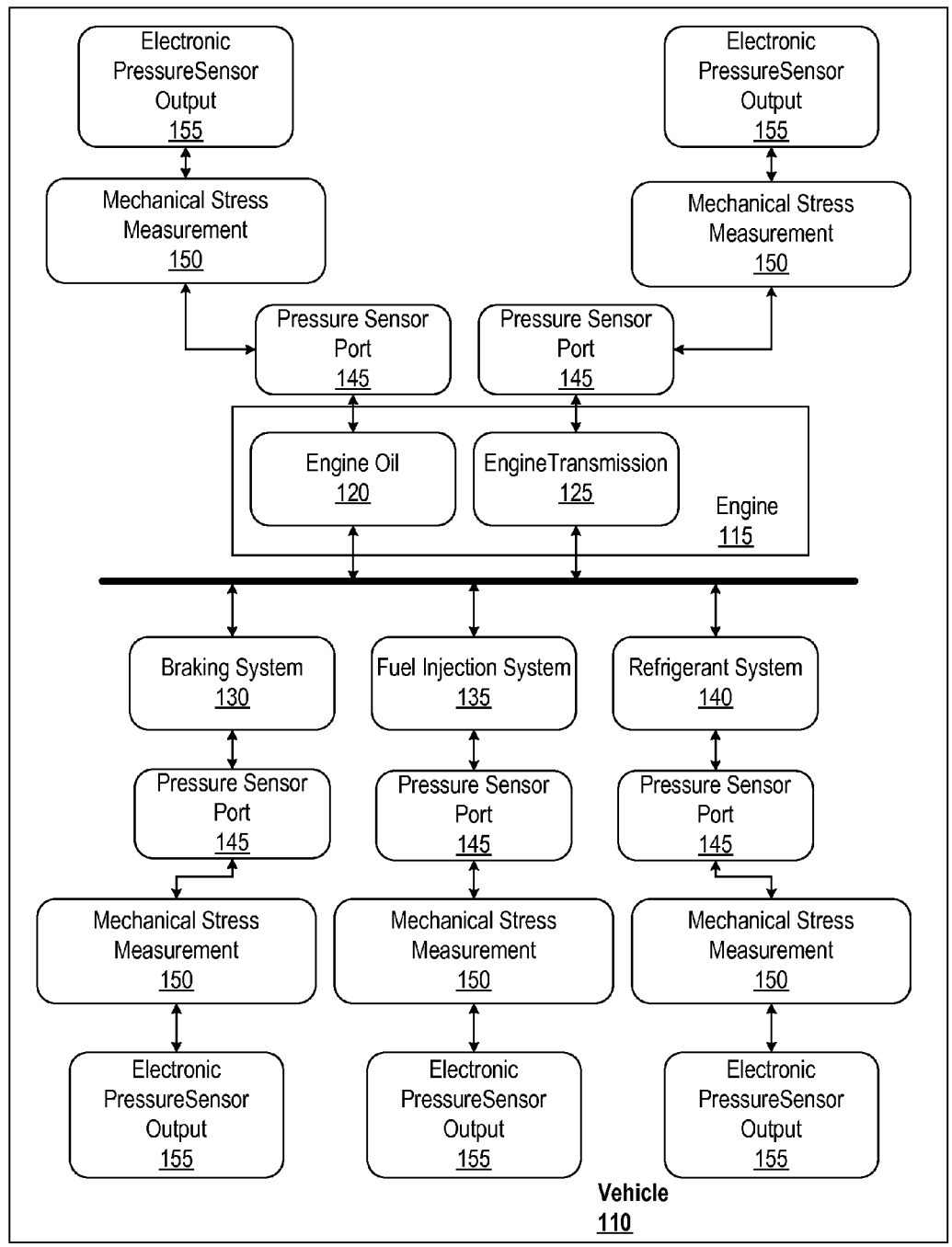
FIG. 1 is a block diagram illustrating a method for measuring pressure through a jointless pressure sensor port for different systems of a vehicle, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

In some embodiments, the jointless pressure sensor port may be used in any system where pressure needs to be measured and monitored. Systems include harsh media and high pressure applications such as the oil and transmission fluids of an engine. In an automobile, pressures in the braking, refrigerant, and fuel injection systems may also be measured. In all these systems, a substance, such as a fluid, enters into the pressure sensor through an aperture and then passes through a channel towards the diaphragm region of the sensor. The substance exerts a mechanical stress on the diaphragm. The stress is then measured and a signal representative of the pressure inside the sensor is generated. The jointless pressure sensor port has increased pressure sensitivity due to the fact that the diaphragm area is larger than the area of the aperture. The size of the mounting interface between the pressure sensor port and the system being monitored is also reduced due to the smaller aperture area of the pressure sensor port. Such a port is also more reliable as a result of its construction and lack of any joints, brazes, or welds.

In some embodiments, the diaphragm area may have a circular geometry. The aperture may also be circular. Like the diaphragm and aperture, the cross section of the channel may also be a circle. The aperture, diaphragm, and channel cross sections may have any geometrical shape as long as the area of the diaphragm is larger than the area of the aperture.

In some embodiments, the channel region of the jointless pressure sensor port may have one or more taper sections. The channel region closest to the aperture may have a taper to match the aperture area to the cross sectional area of the channel region. The taper directs the substance into the pressure sensor and towards the diaphragm. The channel region closest to the diaphragm may also have a taper section that matches the channel cross sectional area to the diaphragm area.

In some embodiments, the jointless pressure sensor port may have two or more diaphragms. The diaphragms may have different areas and dimensions. These diaphragms integrated to a single jointless pressure sensor port allow for increased sensitivity across a broader range of pressures. The multiple diaphragms also allow for sensor redundancy as the stresses on the multiple diaphragms may be independently measured using multiple sensors.

FIG. 1 is a block diagram illustrating a method for measuring pressure through a jointless pressure sensor port for different systems of a vehicle, in accordance with some embodiments.

In some embodiments, vehicle 110 comprises an engine 115 having engine oil 120 and transmission fluid 125. The vehicle 110 also comprises a braking system 130, a fuel injection system 135, and a refrigerant system 140. Each of these components contains a fluid or some other substance whose pressure needs to be monitored. In the engine 115, engine oil 120 is directed into the pressure sensor port 145. The fluid exerts a mechanical stress on the diaphragm of the pressure sensor port 145. This mechanical strain is measured 150 and an electronic pressure sensor output 155 is generated. A similar process occurs for measuring the fluid pressures in the engine transmission 125, the braking system 130, the fuel injection system 135, and the refrigerant system 140.

Figure 2:
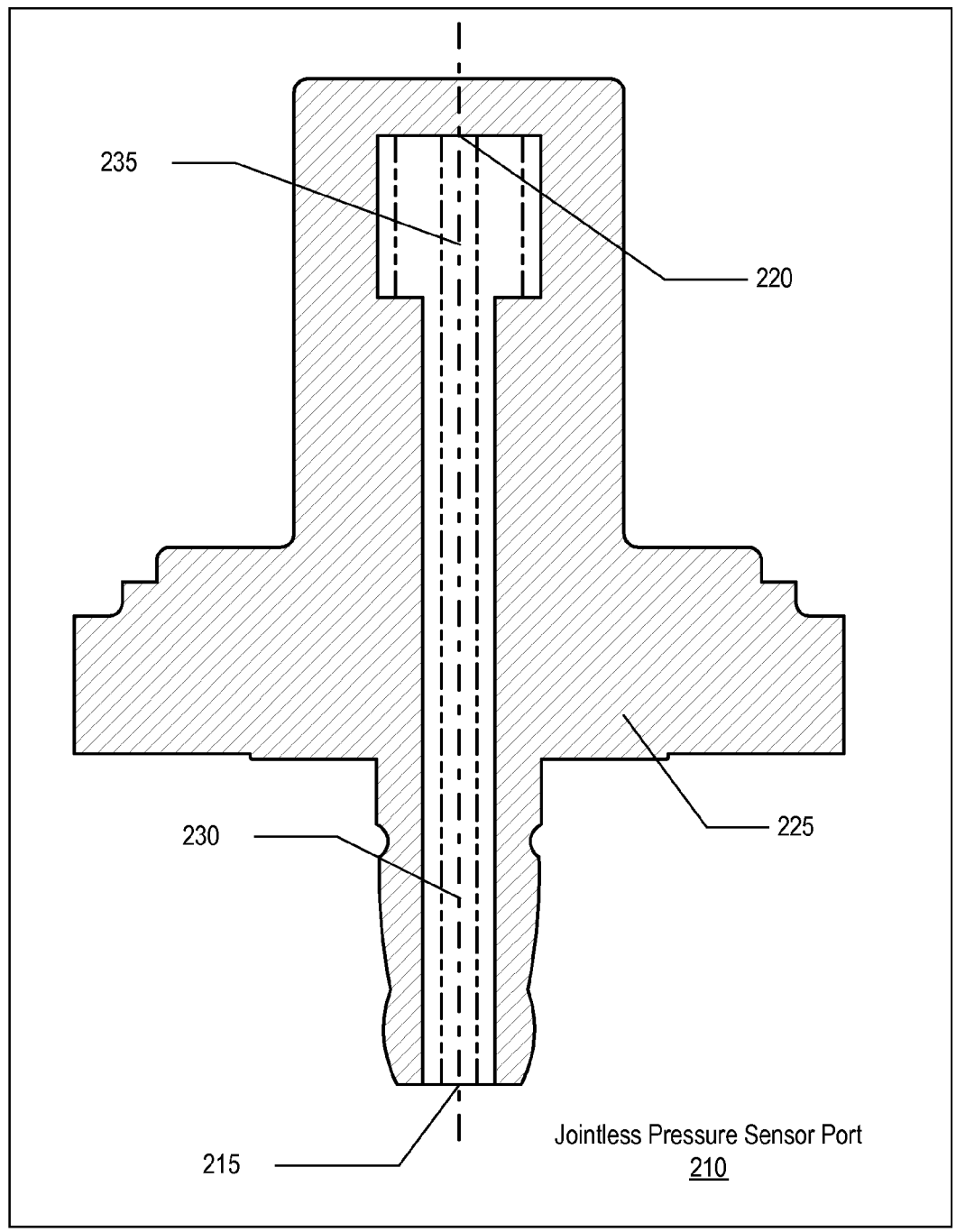
FIG. 2 is a cross sectional view of a jointless pressure sensor port having a larger diaphragm area than aperture area, in accordance with some embodiments.

FIG. 2 is a cross sectional view of a jointless pressure sensor port having a larger diaphragm area than aperture area, in accordance with some embodiments.

In some embodiments, a jointless pressure sensor port 210 is comprised of an aperture 215 whose area is smaller than the area of the diaphragm 220. The pressure sensor port 210 is made from a single piece of material 225 and does not have any welds, brazes, or junctions. The aperture 215 and diaphragm 220 are connected via a channel having two regions. One channel region 230 has the same cross sectional area as the aperture 215 area and the other channel region 235 has the same cross sectional area as the diaphragm 220 area. The larger diaphragm 220 compared to the smaller aperture 215 allows for an increase in sensitivity and overall performance.

Figure 3:
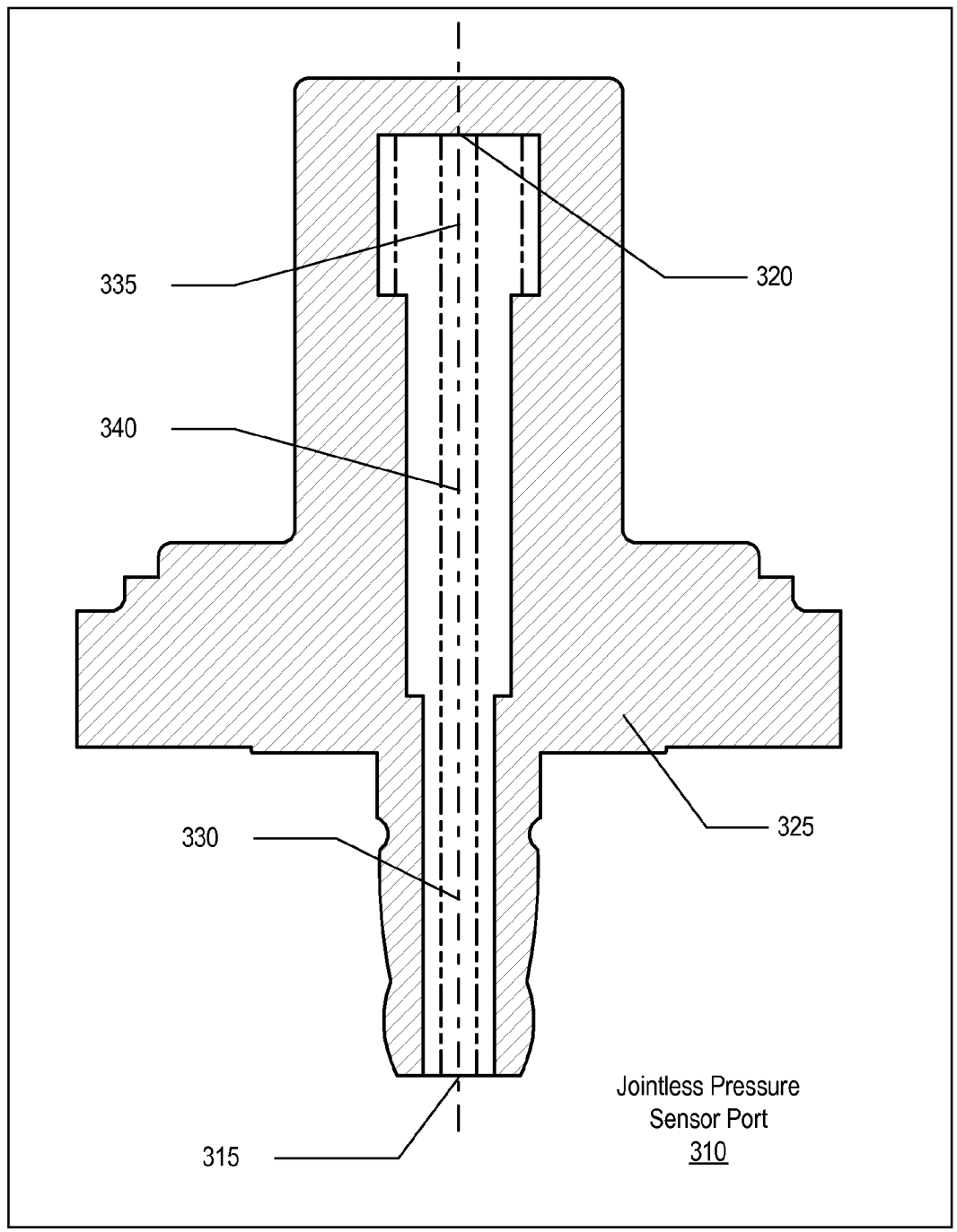
FIG. 3 is a cross sectional view of a jointless pressure sensor port having a larger diaphragm area than aperture area and a channel region of three cross sectional areas, in accordance with some embodiments.

FIG. 3 is a cross sectional view of a jointless pressure sensor port having a larger diaphragm area than aperture area and a channel region of three cross sectional areas, in accordance with some embodiments.

In some embodiments, a jointless pressure sensor port 310 is comprised of an aperture 315 whose area is smaller than the area of the diaphragm 320. The pressure sensor port 310 is made from a single piece of material 325 and does not have any welds, brazes, or junctions. The aperture 315 and diaphragm 320 are connected via a channel having three regions. One channel region 330 has the same cross sectional area as the aperture 315 area. Another channel region 335 has the same cross sectional area as the diaphragm 320 area. There is also an intermediate channel region 340 having a cross sectional area between the area of the aperture 315 and the area of the diaphragm 320. The larger diaphragm 320 compared to the smaller aperture 315 allows for an increase in sensitivity and overall performance.

Figure 4:
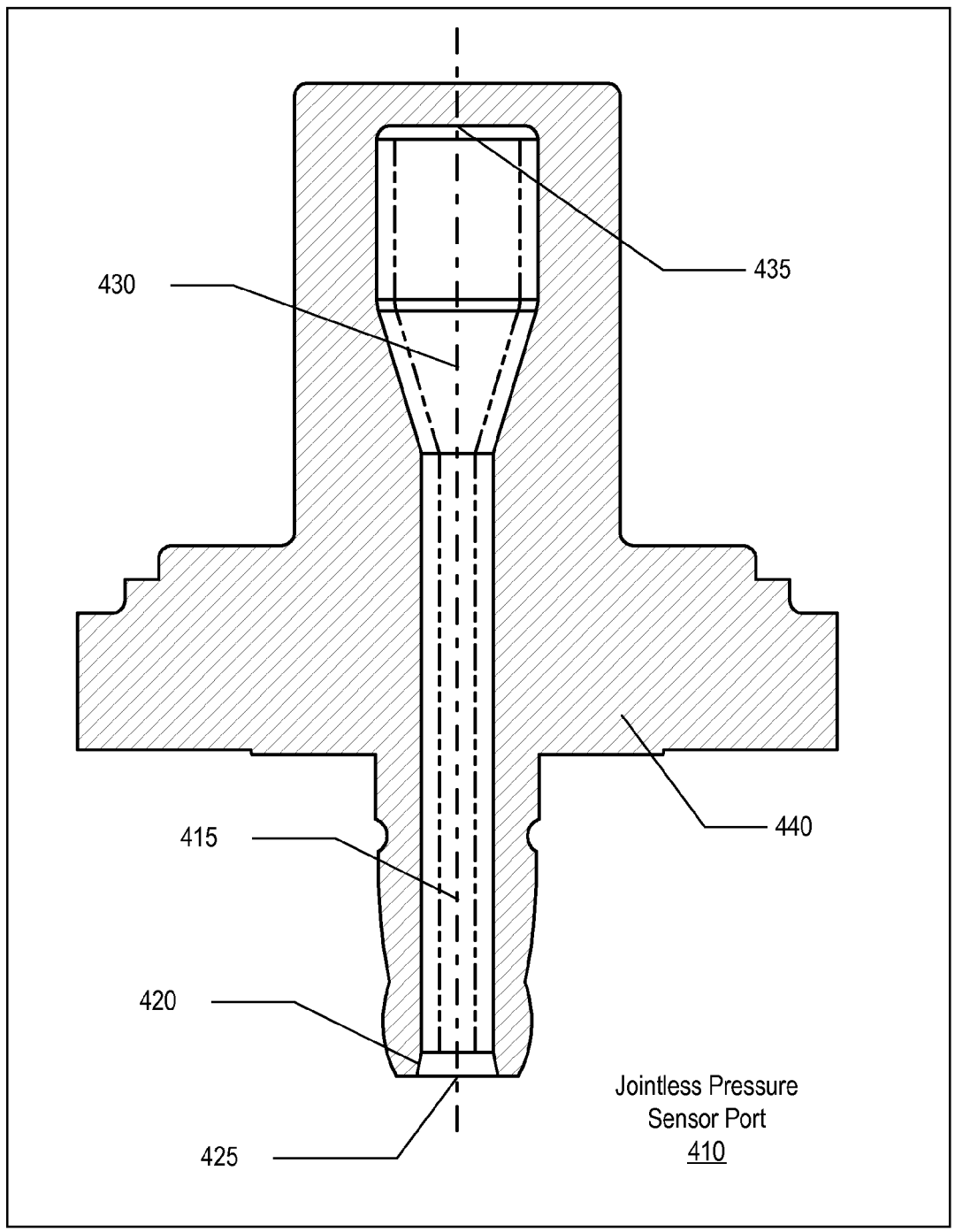
FIG. 4 is a cross sectional view of a jointless pressure sensor port having a larger diaphragm area than aperture area and some regions of the channel having tapers, in accordance with some embodiments.

FIG. 4 is a cross sectional view of a jointless pressure sensor port having a larger diaphragm area than aperture area and some regions of the channel having tapers, in accordance with some embodiments.

In some embodiments, the jointless pressure sensor port 410 has a channel 415 region of more than three cross sectional areas. In one channel region 420 the cross sectional area varies in a taper in order to direct the fluid or substance through the aperture 425 and into the pressure sensor port 410. In another region of the channel 430 the cross sectional area varies in a taper to match the area of the diaphragm 435. The pressure sensor port 410 is made from a single piece of material 440 and does not have any welds, brazes, or junctions. The larger diaphragm 435 compared to the smaller aperture 425 opening allows for an increase in sensitivity and overall performance.

Figure 5:
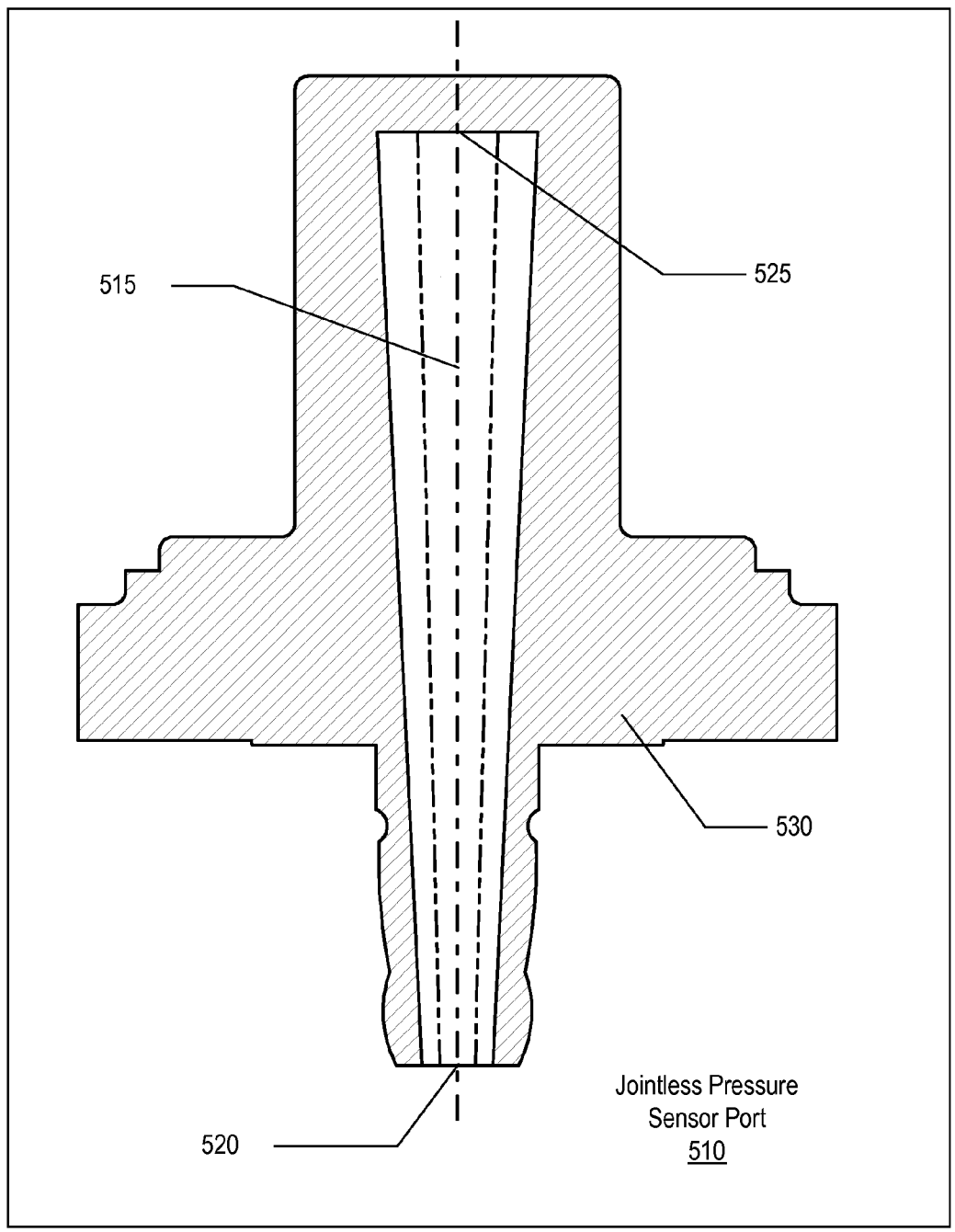
FIG. 5 is a cross sectional view of a jointless pressure sensor port having a larger diaphragm area than aperture area and a tapered channel, in accordance with some embodiments.

FIG. 5 is a cross sectional view of a jointless pressure sensor port having a larger diaphragm area than aperture area and a tapered channel, in accordance with some embodiments.

In some embodiments, the jointless pressure sensor port 510 has a tapered channel 515. The channel 515 matches the area of the aperture 520 to the area of the diaphragm 525. The pressure sensor port 510 is made from a single piece of material 530 and does not have any welds, brazes, or junctions. The larger diaphragm 525 compared to the smaller aperture 520 opening allows for an increase in sensitivity and overall performance.

Figure 6:
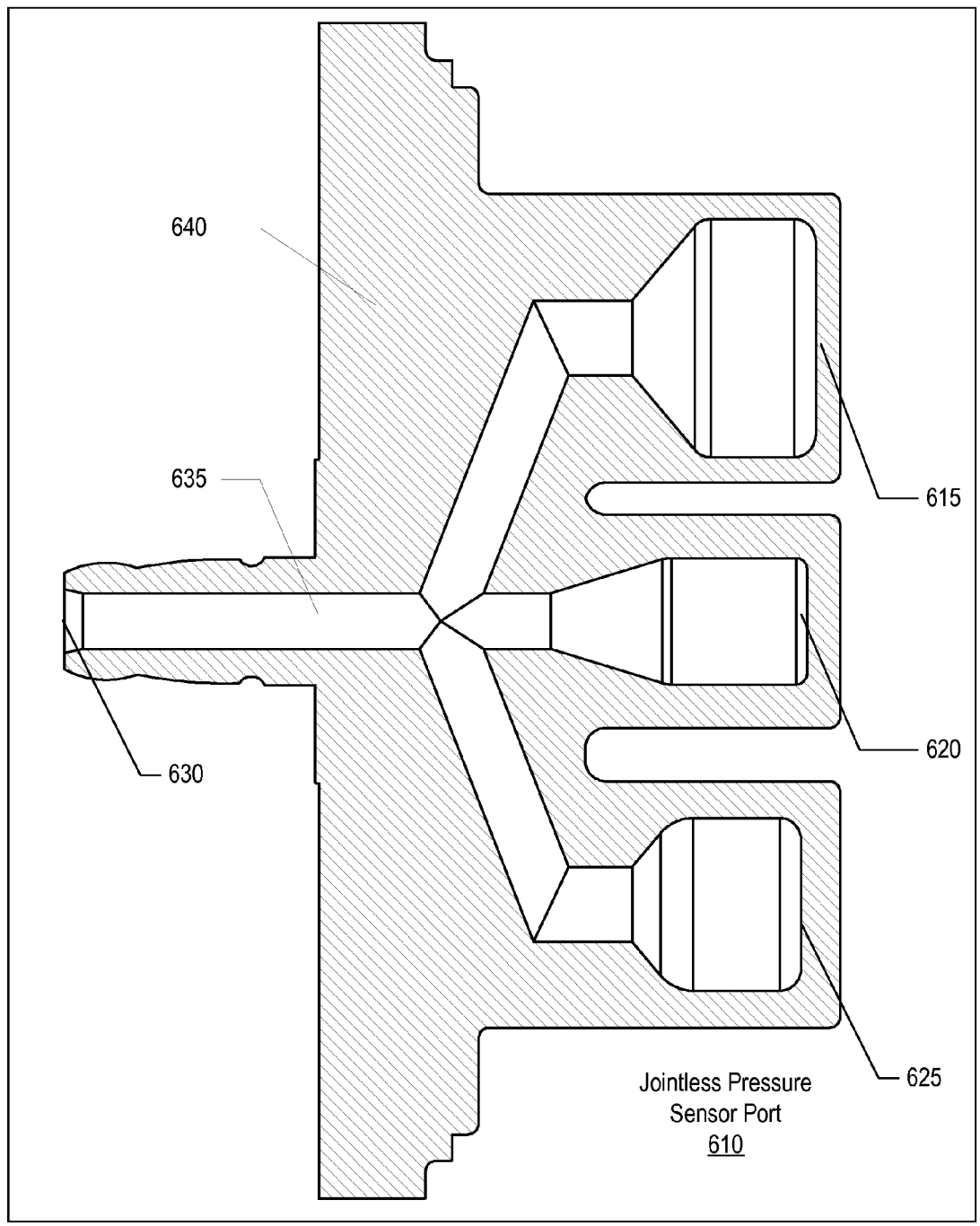
FIG. 6 is a cross sectional view of a jointless pressure sensor port having multiple diaphragms.

FIG. 6 is a cross sectional view of a jointless pressure sensor port having multiple diaphragms.

In some embodiments, the jointless pressure sensor port 610 may have multiple diaphragm regions 615, 620, and 625, of varying dimensions and area. A single aperture 630 is configured to direct a substance through the channel 635 toward the diaphragms 615, 620, and 625. The pressure sensor port 610 is made from a single piece of material 640 and does not have any welds, brazes, or junctions. The multiple diaphragms allow for pressure measurements across a larger pressure range as well as for sensor redundancy.

Figure 7:
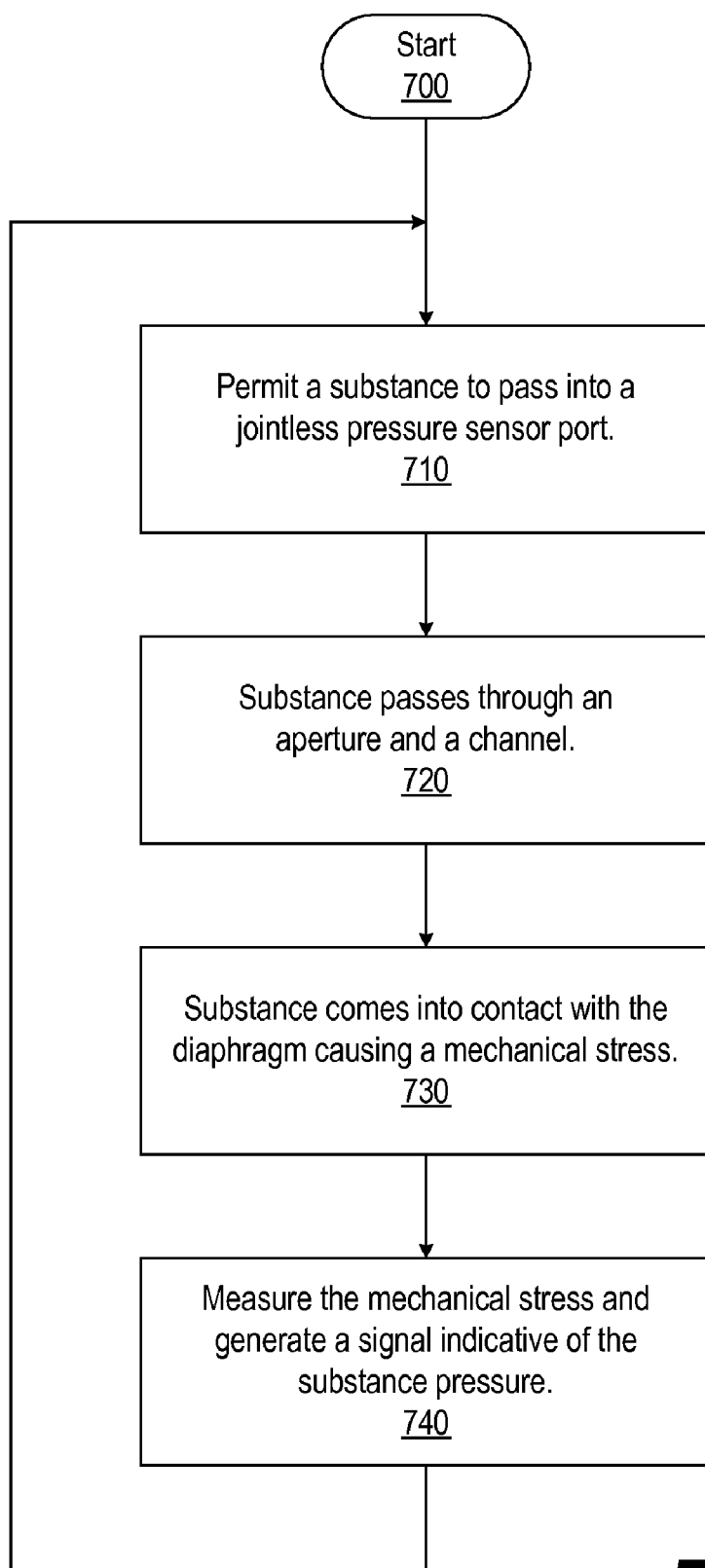
FIG. 7 is a flow diagram illustrating a method for measuring pressure through a jointless pressure sensor port, in accordance with some embodiments.

FIG. 7 is a flow diagram illustrating a method for measuring pressure through a jointless pressure sensor port, in accordance with some embodiments. In some embodiments, the method illustrated in FIG. 7 may be performed by one or more of the devices illustrated in FIG. 2, FIG. 3, FIG. 4, FIG. 5, and FIG. 6.

Processing begins at 700 whereupon, at block 710, a substance is permitted to pass into a jointless pressure sensor port. In some embodiments, the substance is a fluid, a vapor, or a gas.

At block 720, the substance passes through an aperture and a channel. In some embodiments, the channel has three or more cross sectional areas in order to transition from the area of the aperture to the area of the diaphragm. In yet another embodiment, the channel may have one or more taper regions. The taper regions may also have some other geometrical shape.

At block 730, the substance comes into contact with the diaphragm or diaphragms of the jointless pressure sensor port. This contact results in a mechanical stress on the diaphragm or diaphragms. The area of the diaphragm or diaphragms is larger than the area of the aperture, resulting in an increase in sensitivity and overall performance.

At block 740, the mechanical stress on the diaphragm or diaphragms is measured and a signal is generated indicative of the substance pressure. In some embodiments, the stress is measured electronically. In yet another embodiment, the stress is measured optically.

The process loops back to 710 for continuous monitoring of the substance pressure.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for measuring pressure through a jointless pressure sensor port, the method comprising:
   permitting a substance to pass into a jointless pressure sensor port comprising an aperture, a cylindrical portion, a channel, the channel at least partially extending into the cylindrical portion, and a diaphragm having a larger area than the area of the aperture, the diaphragm being substantially perpendicular to an axis of the channel;
   allowing the substance to come into contact with the diaphragm resulting in a mechanical stress on the diaphragm; and
   measuring the mechanical stress to generate a signal indicative of the substance pressure.

2. The method of claim 1, where the channel comprises three or more cross sectional areas, where each of the three or more cross sectional areas is of a different size.

3. The method of claim 1, where the channel comprises a taper.

4. The method of claim 1, where the substance is at least one of: a fluid, a vapor, and a gas.

5. The method of claim 1, where the diaphragm is comprised of multiple diaphragms, and each of the multiple diaphragms is of a different size.

6. The method for measuring pressure through a jointless pressure sensor port of claim 1, further comprising the steps of providing at least one attachment structure integrally formed with said cylindrical portion.

7. A pressure sensor port comprising:
   a housing, where the housing is jointless;
   the housing comprising an aperture, a cylindrical portion, a channel at least partially extending into the cylindrical portion, and a diaphragm, the diaphragm being substantially perpendicular to an axis of the channel;
   where the diaphragm area is larger than the aperture area;
   where the aperture is configured to direct a substance through the channel toward the diaphragm; and
   where the substance is configured to exert a mechanical stress on the diaphragm.

8. The pressure sensor port of claim 7 where a portion of the housing is configured to be the diaphragm.

9. The pressure sensor port of claim 7, where the diaphragm is comprised of multiple diaphragms, and each of the multiple diaphragms is of a different size.

10. The pressure sensor port of claim 7, where the channel between the aperture and the diaphragm consists of three or more cross sectional areas, each of the three or more cross sectional areas is of a different size.

11. The pressure sensor port of claim 7 where the channel is tapered.

12. The pressure sensor port of claim 7 where a portion of the channel is tapered.

13. The pressure sensor port of claim 12 where the taper matches the aperture area to the channel cross sectional area.

14. The pressure sensor port of claim 12 where the taper matches the diaphragm area to the channel cross sectional area.

15. The pressure sensor of claim 7, further comprising at least one attachment structure integrally formed with said cylindrical portion.

16. A vehicle comprising:
   a pressure sensor port;
   the pressure sensor port comprising:
   a housing, where the housing is jointless;
   the housing comprising a cylindrical portion, an aperture, a central channel at least partially extending into the cylindrical portion, a plurality of secondary channels, each of the plurality of secondary channels in communication with the central channel, and a plurality of diaphragms being substantially perpendicular to an axis of the central channel, each of the plurality of diaphragms in communication with one of the plurality of secondary channels;
   where the area of each of the plurality of diaphragms is larger than the aperture area;
   where the aperture is configured to direct a substance through the central channel toward the plurality of secondary channels; and
   where the substance is configured to exert a mechanical stress on the plurality of diaphragms.

17. The vehicle of claim 16, where a portion of the housing is configured to be at least one of the plurality of diaphragms diaphragm.

18. The vehicle of claim 16, where the central channel between the aperture and the diaphragm plurality of secondary channels consists of three or more cross sectional areas, each of the three or more cross sectional areas is of a different size.

19. The vehicle of claim 16, where at least one of the central channel or the plurality of secondary channels are tapered.

20. The vehicle of claim 16, where a portion of one of the central channel or the plurality of secondary channels are tapered.

21. The vehicle of claim 20, where the taper matches the aperture area to the central channel cross sectional areas.

22. The vehicle of claim 20, where the taper matches the area of one of the plurality of diaphragms to the cross sectional areas of one of the plurality of secondary channels.

23. The vehicle of claim 16, further comprising clinching geometry integrally formed with said cylindrical portion.

* * * * *